(12) United States Patent
Porikli

(10) Patent No.: US 7,349,573 B2
(45) Date of Patent: Mar. 25, 2008

(54) IMAGE SEGMENTATION BY BASE POINT SELECTION AND WAVEFRONT PROPAGATION

(75) Inventor: Fatih M. Porikli, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 784 days.

(21) Appl. No.: 10/810,921

(22) Filed: Mar. 26, 2004

(65) Prior Publication Data

US 2005/0213816 A1 Sep. 29, 2005

(51) Int. Cl.
*G06K 9/00* (2006.01)

(52) U.S. Cl. ..................................................... 382/164

(58) Field of Classification Search ................ 382/103, 382/164, 173, 191, 203, 207
See application file for complete search history.

(56) References Cited

U.S. PATENT DOCUMENTS

| 7,035,456 | B2 * | 4/2006 | Lestideau ................... 382/164 |
| 7,146,028 | B2 * | 12/2006 | Lestideau ................... 382/118 |
| 7,212,665 | B2 * | 5/2007 | Yang et al. ................. 382/159 |
| 7,230,429 | B1 * | 6/2007 | Huang et al. ............... 324/322 |

OTHER PUBLICATIONS

T.F. Chan and L.A. Vese, "A level set algorithm for minimizing the Mumford-Shah functional in image processing" *Proceedings. IEEE Workshop on Variational and Level Set Methods in Computer Vision*, pp. 161-168, 2001.

N. Paragios and R. Deriche, "Geodesic active regions and level set methods for supervised texture segmentation" *International Journal of Computer Vision* vol. 46, pp. 223, 2002.

R. Malladi, J. A. Sethian, and B. Vemuri, "Shape □odeling with wavefront propagation: a level set approach," *IEEE Trans. On Pattern Analysis and Machine Intelligence*, vol. 17, pp. 158-175, 1995.

M. Leventon, Olivier Faugeras, Eric Grimson, WilliamWells, "Level Set Based Segmentation with Intensity and Curvature Priors," *IEEE Workshop on Mathematical Methods in Biomedical Image Analysis*, 2000.

K. Siddiqi, A. Tannenbaum, and S.W. Zucker. "Hyperbolic "Smoothing" of shapes", 1998. *Sixth International Conference on Computer Vision*, Jan. 4-7 pp. 215-221, 1998.

O. Faugeras and R. Keriven, "Variational Principles, Surface Evolution, PDE's, level set methods and the Stereo Problem," *IEEE Transactions on Image Processing*, vol. 7, No. 3, pp. 336-344, 1998.

B.C. Vemuri, J. Ye, Y. Chen, C.M. Leonard, "A Level-Set Based Approach to Image Registration," *IEEEWorkshop on Mathematical Methods in Biomedical Image Analysis*, 2000.

\* cited by examiner

*Primary Examiner*—Jose L. Couso
(74) *Attorney, Agent, or Firm*—Dirk Brinkman; Clifton D. Mueller; Gene V. Vinokur

(57) ABSTRACT

A method partitions an image into segments. The image includes pixel points. A set of base points is selected in the image. A wavefront is initialized and emitted from each base point. Each wavefront is propagated according to a speed function until a termination condition is satisfied to determine a corresponding final wavefront. The image is then segmented according to each final wavefront.

21 Claims, 8 Drawing Sheets

IMAGE SEGMENTATION BY BASE POINT SELECTION AND WAVEFRONT PROPAGATION

FIELD OF THE INVENTION

The present invention relates generally to images processing, and more particularly to partitioning an image into homogeneous segments.

BACKGROUND OF THE INVENTION

A large number of image segmentation methods are known. Those methods are generally region oriented, clustering oriented, or edge oriented. Those methods are either based on concepts of similarity or discontinuity of feature values, e.g., intensities or colors, of individual pixels (points) in the image.

A region linkage oriented segmentation method 'grows' regions that have homogeneous intensity or color features. That method starts from an initial 'seed' point or pixel. The region is extended by one pixel at a time. An adjacent pixel is added to the region when a feature distance between the adjacent pixel and the region is less than a predetermined threshold. The linkage method has usually no control over a shape of a current boundary of the region as determined by the thresholding.

Histogram oriented methods attempt to remedy a number of deficiencies of simple thresholding. Additionally, histogram segmentation compensates for shifts in mean intensity level because an image intensity histogram distribution is considered, rather than examining intensity values of individual pixels directly, as in region linkage above. However, histogram segmentation has no explicit notion of connectivity. An implicit assumption is that pixels with similar intensities belong to the same region. This may not be true in general.

Edge-based segmentation takes into account that edges are usually boundaries between segments. Edges are detected by searching for local discontinuities in image features. Then, a tracing process is applied to link edges into continuous and connected segment boundaries. Edge linking techniques suffer from a number of problems. Not only must edge pixels be linked into edge lists, but these lists must also be linked so as to extract closed region boundaries. The closure problem is not straightforward to solve, because many edges may terminate in the same location or large gaps may need to be bridged between edges. Detected edges can often not form a set of closed curves, which surround connected regions.

It is desired to address the disadvantages of the above segmentation methods.

Level sets provide a general framework for modeling surface wavefront propagation, Sethian, "An analysis of flame propagation," Ph.D. Dissertation, Mathematics, University of Berkeley, 1982, and Sethian, "Curvature and evaluation of wavefronts," Commun. in Mathematical Physics, Vol. 101, pp. 487-499, 1985

Level sets have been used to track moving wavefront interfaces in a large number of different applications, from fluid mechanics to computer vision, Osher et al., "Fronts propagating with curvature dependent speed: Algorithms based on Hamilton-Jacobi formulation," Journal of Computational Physics, Vol. 79, pp. 12-49, 1988, Koepfler et al., "A multiscale algorithm for image segmentation by variational method," SIAM J. of Num. Analysis, 31-1, pp. 282-299, 1994, Malladi et al., "Shape modeling with wavefront propagation: a level set approach," IEEE Trans. on Pattern Analysis and Machine Intelligence, Vol. 17, pp. 158-175, 1995, Faugeras et al., "Variational Principles, Surface Evolution, PDE's, level set methods and the Stereo Problem," IEEE Transactions on Image Processing, Vol. 7, No. 3, pp 336-344, 1998, Siddiqi et al., "A Hamiltonian Approach to the Eikonal Equation," Workshop on Energy Minimization Methods in Computer Vision and Pattern Recognition, 1999, Droske et al., "A multilevel segmentation method," Proc. Vision, Modeling and Visualization, MPI Informatik, Germany, pp. 327-336, 2000, Leventon et al., "Level Set Based Segmentation with Intensity and Curvature Priors," IEEE Workshop on Mathematical Methods in Biomedical Image Analysis, 2000, Vemuri et al., "A Level-Set Based Approach to Image Registration," IEEE Workshop on Mathematical Methods in Biomedical Image Analysis, 2000, Paragios et al., "Geodesic active regions and level set methods for supervised texture segmentation" International Journal of Computer Vision, Vol. 46, pp 223, 2002, and Chan et al., "Variational PDE Models in Image Processing," Notices of the American Mathematical Society, 2003.

Prior to level sets, a motion of a curve, a boundary, or a 'wavefront' was represented typically by a discrete parameterization of an object as a set of points. Positions of the points are updated according to a given evolution equation using, for example, snakes, string methods, and marker particles. However, those Lagrangian techniques rely on a continual reparameterization of the surface as the surface becomes more complex. Those methods also tend to disintegrate as a topology of an evolving shape changes.

Level sets use a totally different model to represent moving wavefronts. The level set method views the wavefront propagation as a Eulerian, initial value partial differential equation. The moving wavefront is regarded as a zero level set of higher dimensional function. The evaluation of this higher dimensional function resembles a Hamilton-Jacobi equation, which enables the forming of sharp surface gradients and the incorporation of curvature effects into the propagation of the wavefront.

Prior art image segmentation suffers from either requiring a priori information to initialize regions, being computationally complex, or failing to establish the color consistency and spatial connectivity at the same time. Therefore, it is desired to provide a method, based on level sets, for partitioning an image into homogeneous segments according to some consistency criterion, e.g., color or intensity.

SUMMARY OF THE INVENTION

The invention provides a method for partitioning an image into segments. Previous attempts at image segmentation either require a priori information to initialize segments, are computationally complex, or fail to establish concurrently a color consistency and spatial connectivity. Therefore, the method according to the invention uses a region growing method that is based on a level set.

The segmentation problem is represented as a monotonic wavefront propagation in an absorbing medium with varying speeds of the wavefront. Wavefronts are emitted iteratively from selected base points (pixels). At a selected base point, a local variance of data reaches a minimum. This indicates that the base point is representative of a local neighborhood of the base point.

A hierarchical gradient operator is applied to determine a local variance. A speed at which the wave is propagated is determined by a color similarity of a point on a wavefront to a current coverage of the wavefront, and by edge information. Thus, the wavefront advances in an anisotropic spatial-color space. An absorbing function acts as a stopping criterion of the wavefront.

The invention takes advantage of a fast marching method to solve an Eikonal equation for finding travel times of the wavefronts.

The method according to the invention is superior to linkage-based region growing techniques because the method prevents 'leakage' and imposes compactness on the region without over-smoothing a boundary of the region.

Furthermore, the method according to the invention deals with sharp corners and changes in topology. The automatic segmentation method is Eulerian. Thus, the method is efficient.

DETAILED DESCRIPTION OF THE PREFERRED EMBODIMENT

Level Sets

Figure 1:
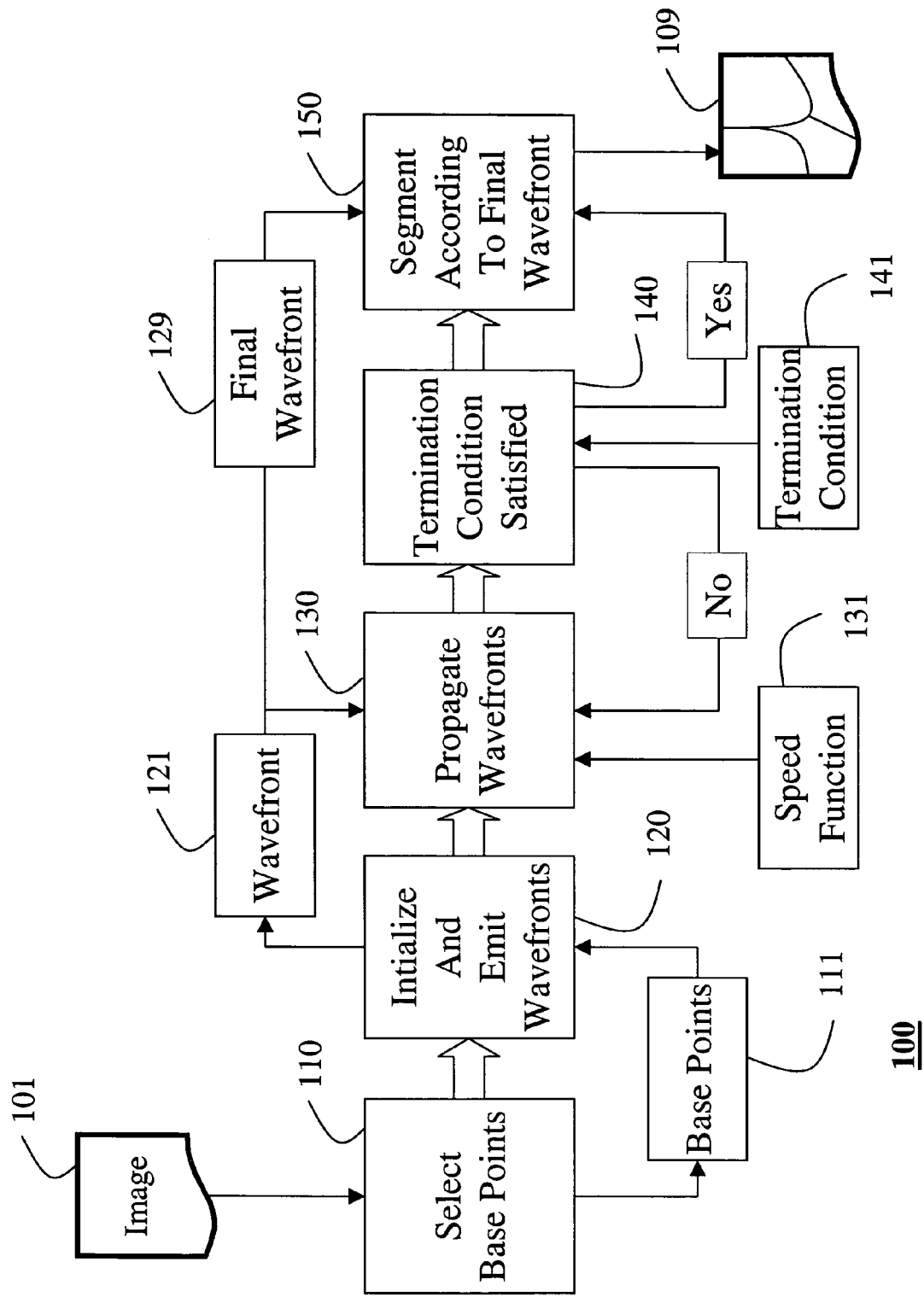
FIG. 1 is a block diagram of a method for partitioning an image into segments according to the invention.

A method for partitioning an image into homogeneous segments according to the invention uses a level set. The method combines a numerical solution of hyperbolic conversation laws into a Hamilton-Jacobi setting. Given a moving closed hypersurface $\psi(x, t)$ in $R^N$, which is a 'wavefront' in the segmentation process, an Eulerian formulation is produced for the motion of the hypersurface propagating along a direction of its normal with a speed F. The speed of propagation can be a function of various parameters, such as curvature, normal direction, position, etc.

The main idea behind the invention is to embed this propagating interface as a zero level set of a N+1 dimensional function $\phi$. The function $\phi(x, 0)$ is defined by $\phi(x, 0)=\pm k$, where k is a distance from a point x: $(\chi, y)$ to a surface $\psi(x, 0)$. Thus, an initial function $\phi(x, 0)$: $R^{N+1} \rightarrow R$ has the property that $\psi(x, 0)=[\chi|\phi(\chi, 0)=0]$, i.e., the hypersurface corresponds to points (pixels) that are at distances k=0 from the surface or wavefront.

This means the zero level set of the evolving function $\phi$ always matches the propagating hypersurface, i.e., $\phi(x, t)=0$. By the chain rule, one can obtain $$\phi_t + \nabla \phi(x,t) x' = 0. \qquad (1)$$

Because an evolution of the wavefront, in its outward normal direction, is equal to the speed of the wavefront F=x'. $\nabla \phi |\nabla \phi|$, a position of the wavefront is the zero level set of $\phi$ at time t as defined by $$\phi_t + F|\nabla \phi(x,t)x| = 0. \qquad (2)$$

If the speed function F does not depend on time and preserves its sign, then the level set function $\phi(x, t)=0$ becomes single-valued in time t, i.e., each pixel is evaluated only one time. This leads to the well-known Eikonal equation $$|\nabla \psi(x)| = F, \qquad (3)$$

where the hyperfunction now corresponds to an arrival time of the wavefront at the point x. One of the subtleties of this equation is that the solution may be non-differentiable.

In $\Re^2$, a finite difference approximation of the gradient term in the Eikonal equation (3) can be obtained as $$|\nabla \psi(x)|^2 \approx \max(D_x^+\psi, 0)^2 + \min(D_x^-\psi, 0)^2 + \max(D_y^+\psi, 0)^2 + \min(D_x^-\psi, 0)^2 = F^2, \qquad (4)$$

where the difference is selected in terms of the direction of the flow information as $$D_x^+\psi = \frac{\psi(x) - \psi(x-1)}{\Delta x}, \; D_x^-\psi \frac{\psi(x+1) - \psi(x)}{\Delta x}. \qquad (5)$$

Further simplification can be achieved by using a uniform grid of pixel points, i.e., $\Delta\chi = \Delta y = 1$. The above formulation is called an 'upwind scheme'. It is straightforward to prove that this scheme converges to the correct viscosity solution. The upwind scheme means that information propagates one way, from smaller values, to larger values of $\psi$.

Fast Marching

A fast marching method solves the Eikonal equation, which applies in the case of a convex, non-negative speed function. Because the wavefront crosses each grid point only once, the moving wavefront problem can be converted into a stationary formulation in which the arriving wavefront contains the information about what is moving.

This can be expressed by Huygens Principle: "Every point on a primary wavefront serves as the source of spherical secondary wavelets such that a primary wavefront, at some later time, is the envelope of these wavelets."

To give an example, consider building a brick wall. One places a brick on a current level of the wall, and then moves laterally, at the same level, and puts another brick on the same level. After all the bricks are placed at a given level, one goes up to the next level and repeats the process. The important thing is that the wall is built from the ground up, each level must be completed before the next level is started. This is, in fact, the main difference between the prior art linkage-based region growing method, and the level set method according to the invention. The linkage-based region growing does not check whether a level is completed before moving to the next level. The linkage-based method can add bricks to the wall at any place where there is an empty space around a brick. This can surely cause the wall to extend in an uncontrollable manner and tumble down.

In contrast, the fast marching method, as described above, imitates the wall building process. Starting with an initial position for the wavefront, the method systematically marches the wavefront outwards one grid point at a time, relying on entropy-satisfying schemes to produce the correct viscosity solution. Similar to the brick-laying process, an Eulerian algorithm determines the arrival times of the wavefront starting from an initial wavefront 0.

Alive, Narrow Band, and Far Away Sets

An alive set includes all image points (pixels) $\psi\{x_i\}$ such that the arrival time of a point $\psi(x_i)=0$ of the wavefront is zero. Initially, the alive set corresponds to $\{x_i : \psi(x_i)=0\}$.

A narrow band set includes neighboring image points (pixels) $\{x_j\}$ of points in the alive set. The arrival time of the points in the narrow band set is $\psi(x_j)=1=F(x_j)$. In essence, the narrow band set of points defines the wavefront according to the invention.

The remaining points in the image are in afar away set of points.

Then, the wavefront is moved forwards using the following iterative process.

Let x* be a point in the narrow band set with a smallest arrival time $\psi(x^*)$;

Move point x* from the narrow band set to the alive set;

Move all neighboring points $x^*_j$ of the point x* from the far away set to the narrow band set if they are not in the narrow band set;

Update $\psi(x^*_j)$ for all neighbors of x*, i.e., solve the Eikonal equation using the quadratic approximation given in the equation (4); and Repeat until no point remains in the far away set.

A heap-sort technique can be used to locate systematically the proper grid point to update. Thus, it is unnecessary to backtrack over previously evaluated points. The resulting technique processes N points in N logN steps.

Segmentation

As shown in FIG. 1, the above wave propagation method is used to partition 100 an image 101 into homogeneous segments 109. Base points 111 are selected 110 in the image 101. Wavefronts 121 are initialized and emitted 120 from the selected base points 111. The wavefronts 121 are propagated 130 according to a speed function. Then, properties of these wavefronts are evaluated to determine 140 if a termination condition 141 is satisfied. If the termination condition is satisfied, then the final position of wavefronts or 'boundaries' are used to produce 150 the segments 109, otherwise the propagation continues.

In other words, each base point 111 serves as a seed of the segment to which the base point belongs, and the wave propagation 130 expands the segment by wavefront propagation until the termination condition is satisfied.

Figure 2:
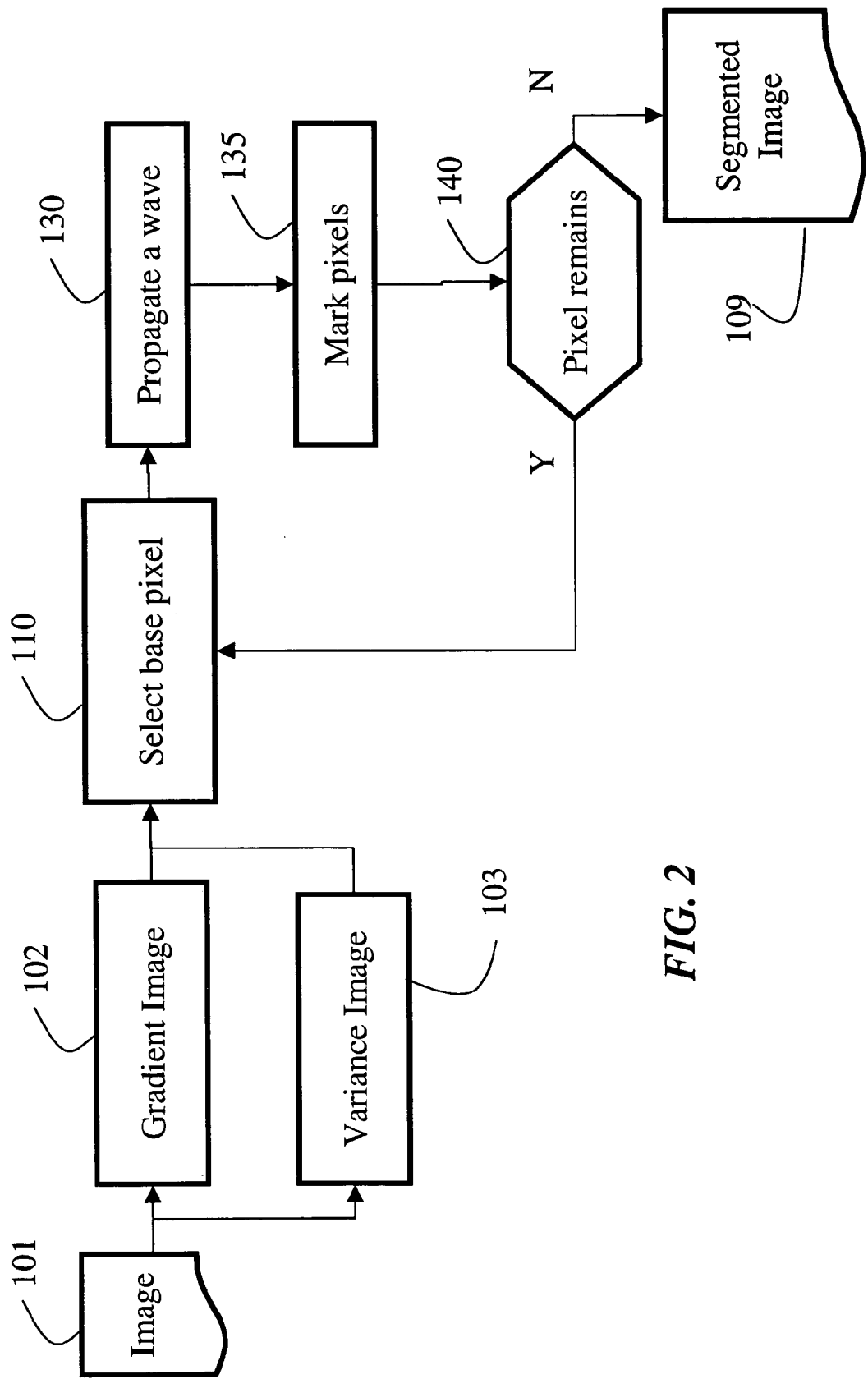
FIG. 2 is a block diagram of further details of the method of FIG. 1.

As shown in FIG. 2, further details of the method according to the invention can be summarized generally as:

Select 110 a base point 111;

Initialize and emit 120 a wavefront 121;

Propagate 130 the wavefront 121 according to a speed function 131;

Determine 140 if a termination condition 141 is satisfied, see FIG. 1; and

Mark 135 the current segment, and remove the current segment 109 from set of available points. If no point remains in step 140, then stop, otherwise iterate with step 1 to select the next base point.

In FIG. 2, the termination condition is a check to determine if any pixel that is not included in any of the previously segmented regions remains in the image. If there are such pixels, then another base pixel is selected 110, and the wavefront propagation 130 is repeated.

In other words, the step 140 in FIG. 2 represents a process that is applied pixels are marked due to wavefront propagation result, which leads to a segmented region. The marking 135 applies a distinct label to the pixels that are in the same region that is obtained by wavefront propagation, i.e., all pixels in the region have the identical label, e.g., a number, which is different from the labels of other regions.

Selecting Base Points

The base points 111 are selected 110 iteratively, that is one at the time. After a base point has been selected, the wavefront is propagated, and the segment is identified. An image point (pixel) is selected as a base point b if the point represents a distribution, e.g., a color or intensity distribution, within a relevant local neighborhood. A variance $\sigma^2$, and a gradient $\nabla I$ are good indicators of color or intensity homogeneity. Therefore, construct a gradient image 102 and a variance image 103 in preliminary step.

The likelihood of being a base point is inversely proportional to the gradient and variance. A point has a high likelihood of being a base point if it a least gradient value and a least variance value with respect to global maximum gradient and variance values. The gradient and variance indicate that the color of the point is consistent with neighboring points, and that the color distribution is uniform around the point. This selection process prevents initializing and emitting a wavefront at an edge, which can disturb the local homogeneity of the segment. The selection 110, as described above, effectively centers the initial wavefront for a more accurate segment boundary localization. Ideally, a base point should be at the center of the segment to which the base point belongs.

Let I(x, c) be the color value of the point in a corresponding color channel c. Assuming the color space is orthogonal, e.g., RGB, the local color variance within a local window W around point is defined as $$\sigma^2(x) = \sum_c \sum_{x \in W} \omega[I(x, c) - \mu(x, c)]^2, \qquad (6)$$

where $\mu(x, c)$ is the mean of the color within the window, and $\omega$ is an envelope function, which has a Gaussian form. A contribution of all points within the window is same, i.e. $\omega=1$. The color gradient is $$|\nabla I(x)| = \sum_c |I(x) + 1, y, c) - I(x - 1, y, c)| + \qquad (7)$$
$$|I(x, y + 1, c) - I(x, y - 1, c)|.$$

Using the gradient and variance images 102-103, a dissimilarity score d(x) is determined for an image point as $$d(x) = \alpha_1 \left( \sum_k^{K-1} \psi_k(x) \right)^2 + \alpha_2 |\nabla I(x)| + \alpha_3 \sigma^2(x), \qquad (8)$$

where K–1 is the number of the previously emitted wavefronts, k is the arrival time of the $k^{th}$ wavefront, and $\alpha_1$, $\alpha_2$, and $\alpha_3$ are constant weights.

Initially, there is only one wavefront K=1, and the arrival times $\psi(x)$ are set to a maximum number. For the Eularian method, the contribution of the previous arrival times is dismissed, i.e., the weight is set to zero, i.e., $\alpha_1=0$, and only the points that are not included in the previous segments are considered. For the non-Eularian method, all image points are evaluated. The point with the least dissimilarity score is assigned as the next base point according to $$b_K: \arg\max_x d(x). \qquad (9)$$

Figure 4:
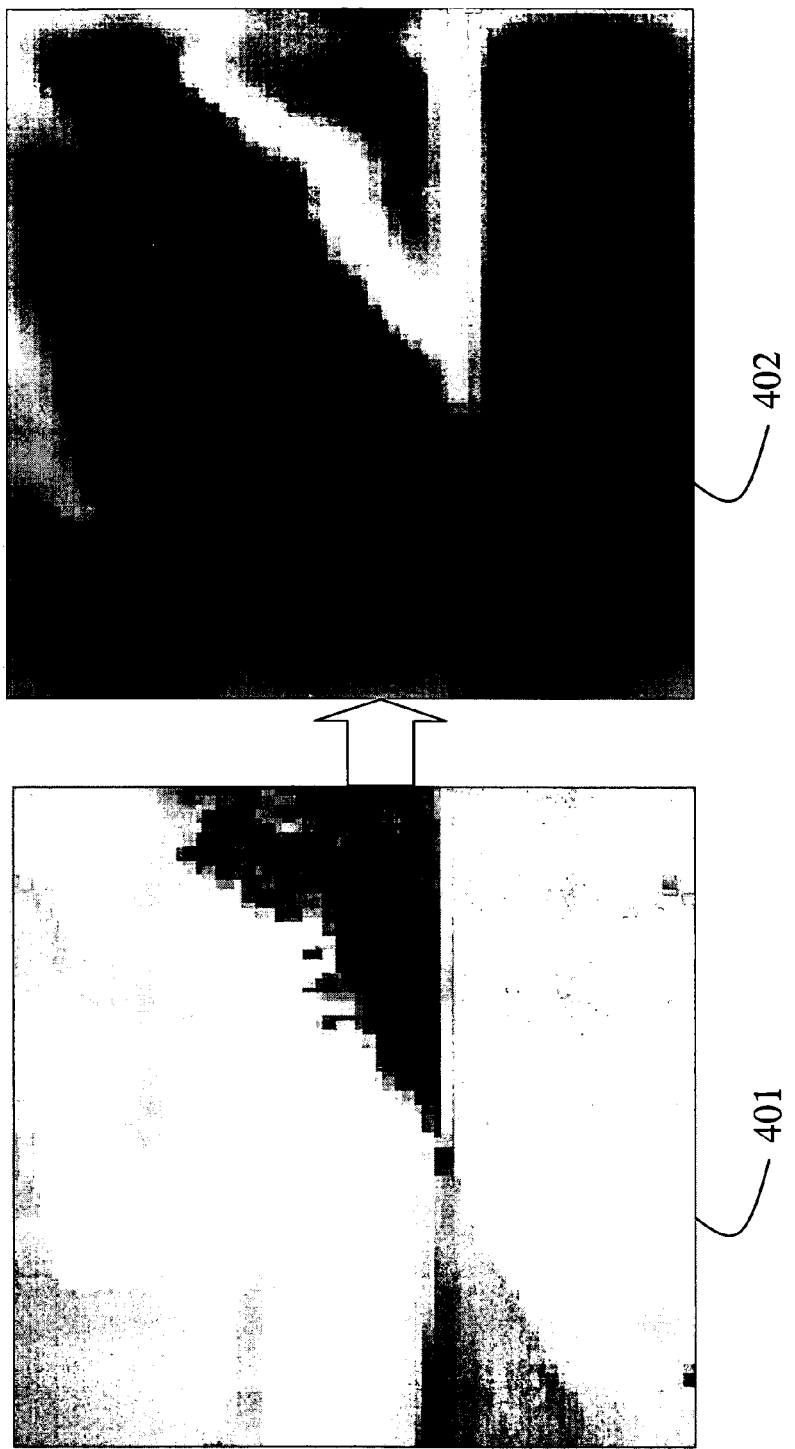
FIG. 4 shows an input image and a corresponding variance image.
Figure 5:
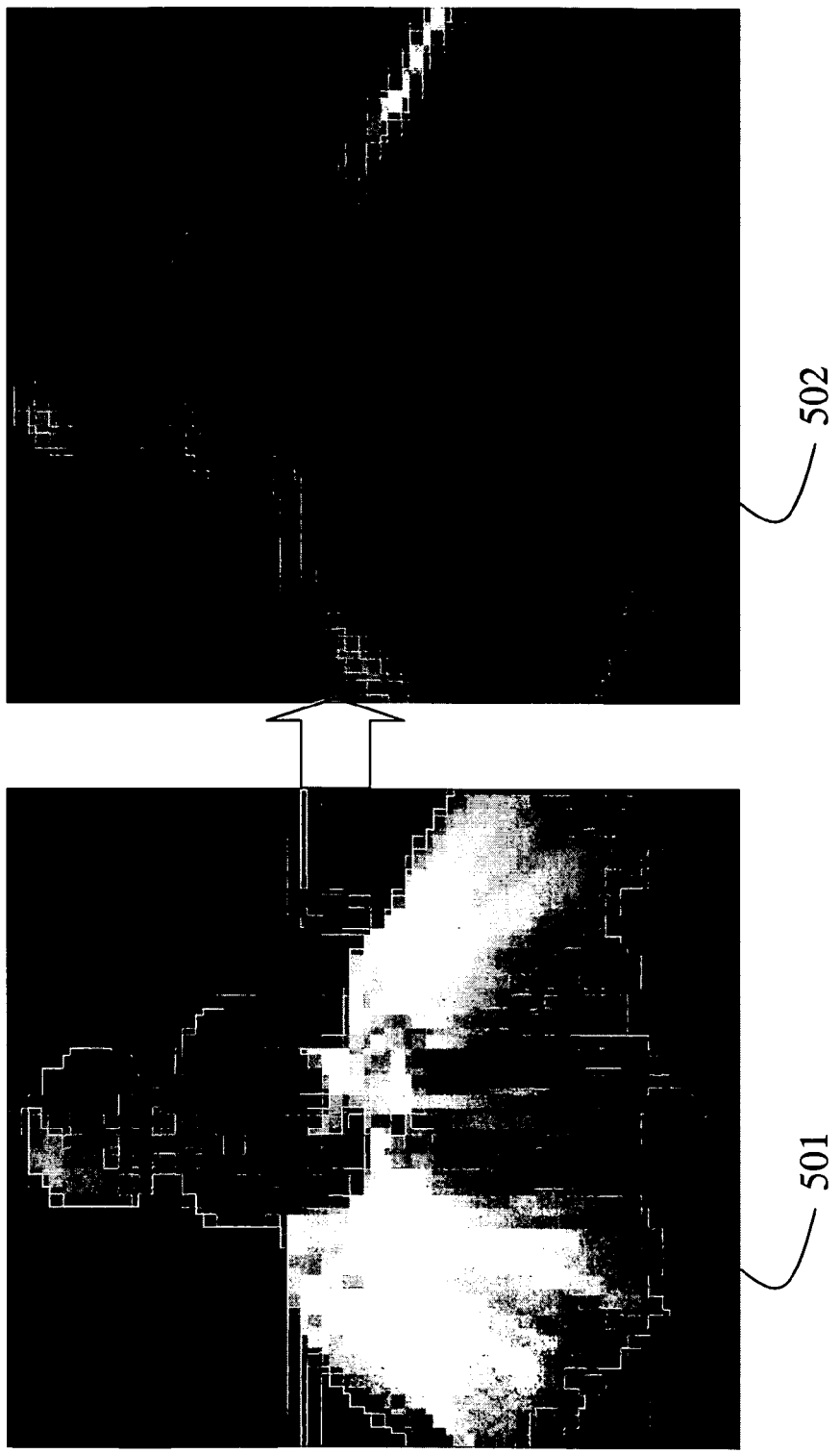
FIG. 5 shows an input image and a corresponding variance image.
Figure 6:
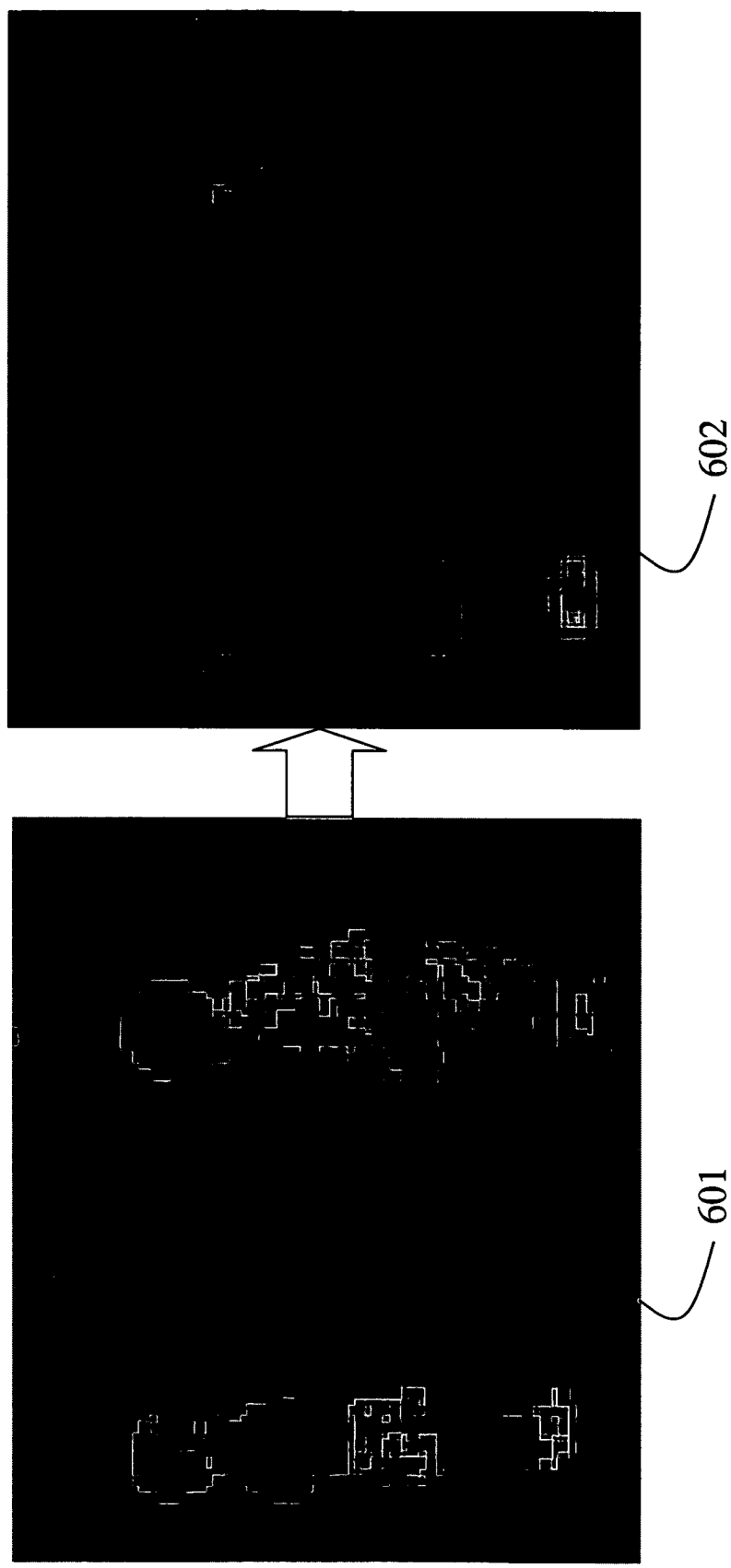
FIG. 6 shows an input image and a corresponding variance image.

FIGS. 4-6 show sample images 401, 501 and 601, and their corresponding local color variance images 402, 502, and 602. To determine the variance within a bigger window without increasing the computational load, equation (6) is applied using the same window size (5×5) in a hierarchical manner at different image resolutions, e.g., the original resolution, the original resolution downsampled by two, and the original image downsampled by four.

The mean and variance images are constructed at each resolution level. Then, the mean and variance at each level are aggregated by compensating for the downsizing. For each base point, a substantially circular wavefront K is initialized and centered on the base point. The wavefront is 'substantially' circular in the sense that it is understood that pixels in an image are discrete and regularly spaced. Initially, only the base point bK and its 4-neighbors are on the wavefront K. The points on the current wavefront also correspond to the narrow band $B_K$ set defined above.

A mean color $S_K$ of a segment is assigned to the current segment K; $S_K=I(b_K)$.

Wave Speed

The conventional Eikonal equation assumes that the speed of the wave on the normal direction to the wavefront is constant. In contrast, in the method according to the invention, the speed of the wavefront is modified as a function of color to make the propagation adaptive to the underlying color distribution.

Therefore, three different sources of information are embedded into the speed function, namely a color similarity of a current point to a current segment, a color gradient, and a color variance. In case the color value of the current point in the narrow band is similar to the segment's color mean, the speed is increased to include the point in the segment. If a point has significantly different color value, the speed of the wavefront propagation decreases at this point. The speed function is set as a function of a color distance $$F(x)=g(|I(x), S_K|, |I(x)|, \sigma^2(x), \qquad (10)$$

where $\|.\|$ is a distance norm, e.g., a magnitude of the difference ($L_1$).

A simple speed function is given by $F(x)=|I(x)-S_K|$. At each iteration of the fast marching, update the mean $S_K$ of the segment color is updated, the color of the narrow band set $B_K$, the number of points $N_K$ in the alive set of points, and the number of points $M_K$ in the current narrow band set as $$S_K^t = 1/N_K^t[N_K^{t-1}S_K + I(x^*)], \qquad (11)$$

$$B_K^t = 1 / M_{tK}\left[M_K^{t-1}B_K - I(x_j^*) + \sum_j^C I(x_j)\right],$$

$$N_K^t = N_K^{t-1} + 1, \text{ and } M_K^t = M_K^{t-1} - 1 + C.$$

The speed of the wave is determined by using the above color mean parameters to achieve color homogeneity of the segment.

Termination Conditions

Figure 3:
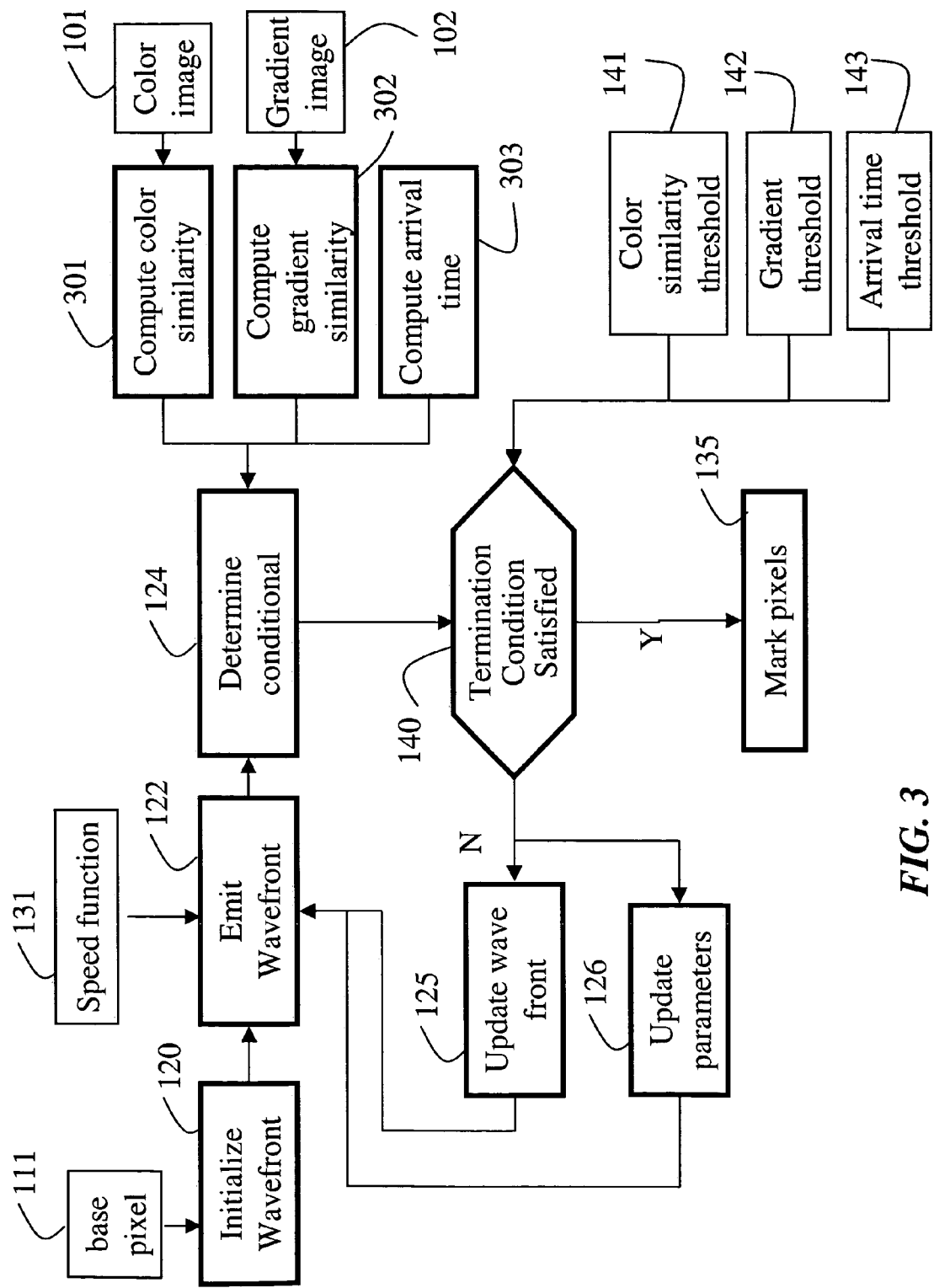
FIG. 3 is a block diagram of additional details of the method of FIG. 1.

An important problem of region growing is determining termination conditions. Four different termination conditions are possible for the Eulerian approach, as shown in FIG. 3. The conditional expression for a particular termination condition is determined in step 124. One condition measures a color similarity 301 of the segment and the current point according to $$\|S_K-I(x^*)\|<\tau_A. \qquad (12)$$

That is, if the color value of the current point is greater than that a color similarity threshold $\tau_A$ 141, then the wavefront stops at that point. The threshold 141 can be set to a constant. A threshold $\tau_A=3.2^m/64$ produces accurate segmentation for most images under the assumption that color channels are m-bit coded. This value can be obtained empirically.

Another measure makes a comparison between the point and the segment, and also compares the whole wavefront with the segment according to $$\|S_K-B_K\|<\tau_B \qquad (13)$$

Here, the threshold is similar to the previous color threshold, i.e., $\tau_A=\tau_B$.

The segment can also be expanded up to the edges:

$$|\nabla I(x^*)|<\tau_C \qquad (14)$$

However, this termination condition 142 relies on the assumption that the speed of the wavefront is constant. Thus, the wavefront can continue moving until it reaches an edge. In this formulation, a point that has a larger gradient value than the threshold $\tau_C$ 142 is considered as an edge point. In case the wavefront reaches an edge, the wavefront stops marching at that point, and the propagation continues until no more expansion is possible. Thus, this condition depends on a gradient similarity 302.

Alternatively, for a non-constant wavefront speed function, the arrival time $\psi(x)$ of the wavefront can used as a termination condition 303. The wave continues propagating as long as $$\psi(x^*)<\tau_D. \qquad (15)$$

It is necessary to consider the effect of the size of the image size and the parameterization of the speed function when the threshold is assigned. If the arrival time threshold $\tau_D$ 143 is not scaled with the image dimensions, a wavefront can stop prematurely in case of a large segment.

In FIG. 3, the termination step 140 checks a conditional produced by step 124 to determine whether to continue wavefront propagation 122, or to terminate using one of the similarity scores determined in steps 301-303 and one of the corresponding thresholds 141-143, e.g., color similarity with color threshold, gradient magnitude with gradient threshold, time with arrival time threshold. The termination condition is score>threshold. If the termination condition is not satisfied, then the wavefront is updated 125, and the parameters are updated 126.

Thus, the termination condition in step 140 of FIG. 3 is a conditional to determine whether to propagate the current wavefront, while in FIG. 2, the termination condition determines whether to initialize a new wavefront.

Speed Function

The method according to the invention can be used with a constant or varying speed function $F(x)=\alpha_1|s_K-I(x)|+\alpha_2|\nabla I(x)|+\alpha_3$, $\alpha_1>\alpha_2>\alpha_3$. The constant term $\alpha_3$ incorporates the effect of the distance from the base point. Thus, the term serves as a reinforcement on the shape of the wavefront. In other words, the constant term acts as a viscosity parameter and controls the curvature of the wavefront. Note that, in case of $\alpha_2>>\alpha_3$, the wavefront moves forward at a constant speed by disregarding the color similarity of the wavefront to segment.

FIG. 4 shows the motion of the wavefronts 401 and the corresponding arrival times 402 for the image of FIG. 2. As is visible from the Figure, the wavefront can successfully modify its shape to match the underlying color distribution.

Figure 7:
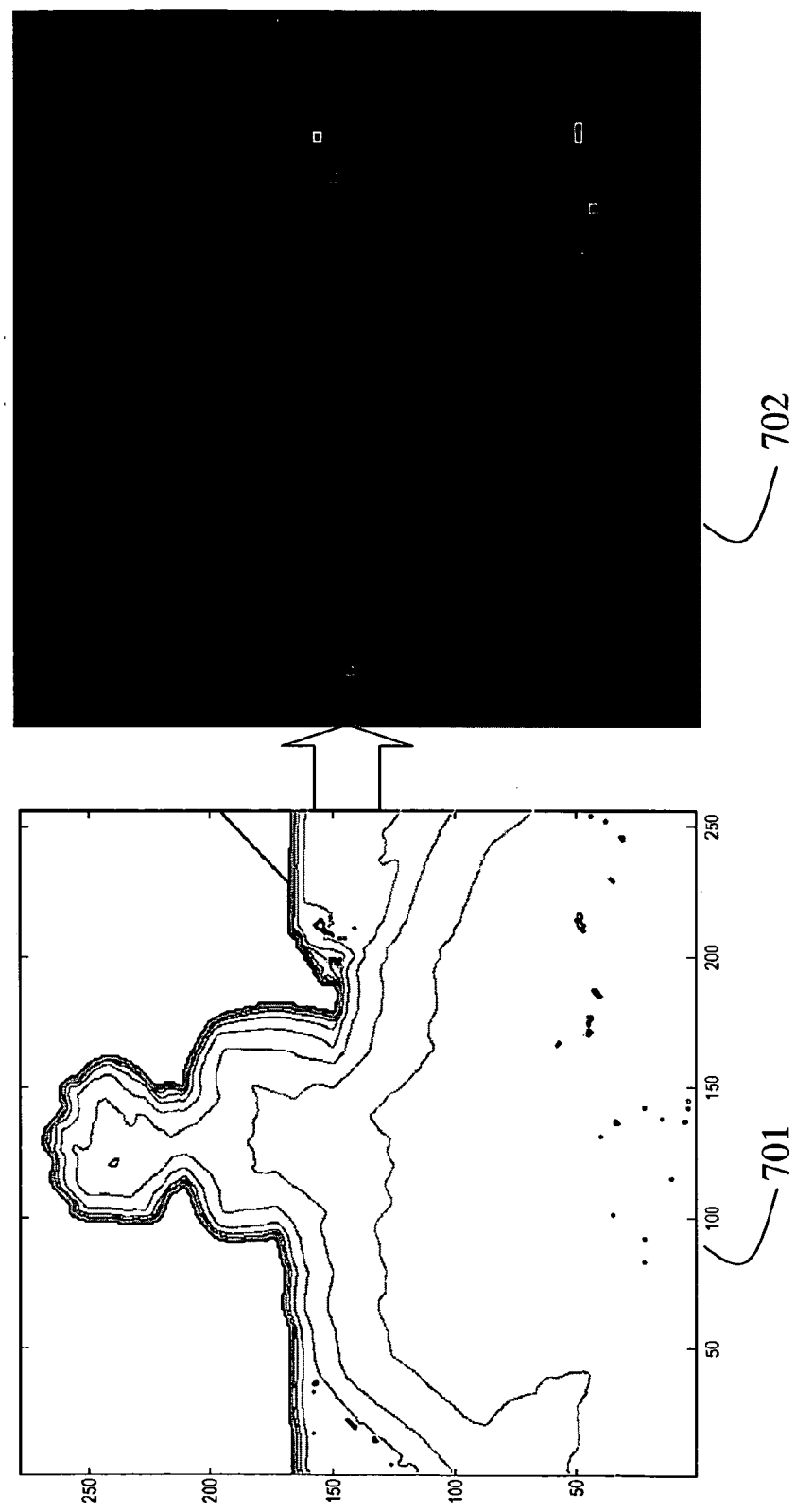
FIG. 7 is shows wavefront propagation for the image of FIG. 5, and the corresponding boundary of the wavefront upon termination.
Figure 10:
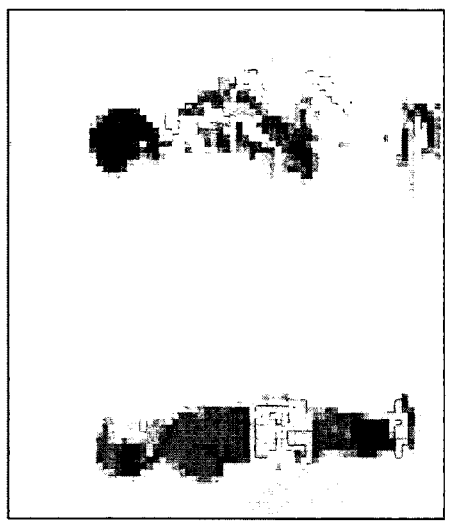
FIG. 10 is an image partitioned into segments corresponding to the image of FIG. 6.
Figure 9:
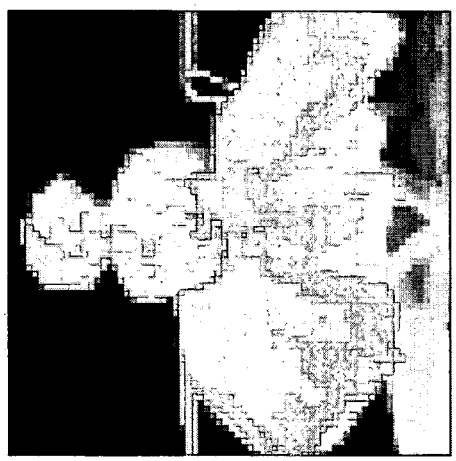
FIG. 9 is an image partitioned into segments corresponding to the image of FIG. 5.
Figure 8:
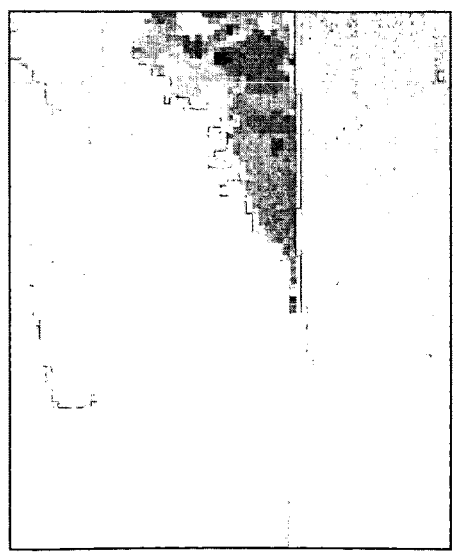
FIG. 8 is an image partitioned into segments corresponding to the image of FIG. 4.

FIGS. 5-7 show the extracted segments for the corresponding images in FIGS. 1-3 using the method according to the invention.

EFFECT OF THE INVENTION

The invention provides a method for partitioning an image into segments by propagating a wavefront. The invention overcomes limitations of prior art region growing techniques. The invention uses a color similarity measure, a gradient based speed function, and four different propagation termination conditions.

Using the level set techniques, the invention effects concurrently integration of spatial continuity, boundary shape control, and color consistency. This is an important improvement over conventional linkage-based region growing methods.

Furthermore, the fast marching solution of the Eikonal equation effectively reduces the computational cost of the segmentation process. The method is robust and accurate.

It is to be understood that various other adaptations and modifications can be made within the spirit and scope of the invention. Therefore, it is the object of the appended claims to cover all such variations and modifications as come within the true spirit and scope of the invention.

I claim:

1. A method for partitioning an image including a plurality of points into segments, comprising:
   selecting a set of base points in the image;
   initializing and emitting a wavefront from each base point;
   propagating each wavefront according to a speed function until a termination condition is satisfied to determine a corresponding final wavefront;
   segmenting the image according to each final wavefront; and
   rendering the segmented image.

2. The method of claim 1, further comprising:
   constructing a gradient image from the input image;
   constructing a variance image from the input image; and
   selecting each base point iteratively in order of least gradient and variance values in the respective gradient and variance images.

3. The method of claim 2, in which a likelihood of selecting the base point is inversely proportional to the gradient and variance values.

4. The method of claim 2, in which the gradient image and the variance image are constructed at hierarchical resolution levels.

5. The method of claim 1, in which the initial wavefront is substantially circular.

6. The method of claim 1, in which the speed function varies according to colors in the image.

7. The method of claim 6, in which a speed of propagation increases for adjacent points having a similar color and decreases for the adjacent points having a dissimilar color.

8. The method of claim 6, in which a speed of propagation increases for adjacent points having a low average gradient magnitude and decreases for the adjacent points having a high average gradient magnitude.

9. The method of claim 6, in which a speed of propagation increases for adjacent points having a low gradient magnitude on the normal direction to the wavefront and decreases for the adjacent points having a high gradient magnitude on the direction normal to the wavefront.

10. The method of claim 1, in which the termination condition is a color similarity of the points.

11. The method of claim 1, in which the termination condition is an edge in the image.

12. The method of claim 1, in which the termination condition is an arrival time of each wavefront.

13. The method of claim 1, in which the speed function is constant.

14. The method of claim 1, in which the speed function is varying.

15. The method of claim 1, in which the propagating is performed iteratively using fast marching.

16. The method of claim 15, further comprising:
   choosing $x^*$ as a point in a narrow band set of points with a smallest arrival time $\psi(x^*)$ of the wavefront;
   moving point $x^*$ from the narrow band set of points to a current segment;
   moving all neighboring points $x^*_j$ of the point $x^*$ into the narrow band set of points if the neighboring points are not in the narrow band set of points;
   updating the arrival time $\psi(x^*_j)$ for all the neighboring points of $x^*$,
   updating a color mean for the current segment;
   updating a color mean for the narrow band set of points;
   increasing a total number of points in the current segment; and
   updating a total number of points in the narrow band set of points.

17. The method of claim 16, in which the color mean of the current segment is $S_K$, and updated the color mean by $S^t_K = 1/N^t_K [N^{t-1}_K S_K + I(x^*)]$, where t is time, and $N_K$ is the total number of points in the current segment, and I is the image.

18. The method of claim 16, in which the narrow band set of points is the wavefront.

19. The method of claim 16, in which the color mean of the narrow band set of points is $B^t_K$, and the color mean is updated by $$B^t_k = 1 \bigg/ M_{tK} \left[ M^{t-1}_K B_K - I(x^r_j) + \sum_{j}^{C} I(x_j) \right],$$

where $M_K$ is the number of points in the current narrow band set.

20. The method of claim 16, in which the color mean $S_K$ of the current segment and the color mean of the narrow band set of points are used to determine color similarity.

21. The method of claim 16, in which a set of representative colors for the current segment and a set of representative colors for narrow band set of points are used to determine color similarity.

* * * * *